United States Patent
Takahashi et al.

(10) Patent No.: US 9,145,842 B2
(45) Date of Patent: Sep. 29, 2015

(54) NOX SENSOR DIAGNOSIS APPARATUS AND SELECTIVE CATALYTIC REDUCTION SYSTEM

(75) Inventors: Hirotaka Takahashi, Fujisawa (JP); Masashi Mizutani, Fujisawa (JP); Takanobu Ogawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 519 days.

(21) Appl. No.: 13/698,189

(22) PCT Filed: May 16, 2011

(86) PCT No.: PCT/JP2011/061224
§ 371 (c)(1),
(2), (4) Date: Nov. 15, 2012

(87) PCT Pub. No.: WO2011/145574
PCT Pub. Date: Nov. 24, 2011

(65) Prior Publication Data
US 2013/0060486 A1    Mar. 7, 2013

(30) Foreign Application Priority Data
May 17, 2010    (JP) .................................. 2010-113751

(51) Int. Cl.
*G06F 19/00* (2011.01)
*F02D 41/22* (2006.01)
(Continued)

(52) U.S. Cl.
CPC .............. *F02D 41/222* (2013.01); *F01N 3/208* (2013.01); *F01N 2560/026* (2013.01);
(Continued)

(58) Field of Classification Search
CPC .......... F01N 2560/026; F01N 2610/02; F01N 3/208; F02D 41/146
USPC ............................... 702/12, 45, 130, 182–185
See application file for complete search history.

(56) References Cited

U.S. PATENT DOCUMENTS 6,427,437 B1 *  8/2002  Bidner et al. ................... 60/274
2007/0137181 A1 *  6/2007  Upadhyay et al. .............. 60/286
(Continued)

FOREIGN PATENT DOCUMENTS

| JP | 2000-303826 | 10/2000 |
|---|---|---|
| JP | 2002-106327 | 4/2002 |

(Continued)

OTHER PUBLICATIONS

Written Opinion of the International Searching Authority mailed Jun. 14, 2011 in corresponding International Application No. PCT/JP2011/061224.

(Continued)

*Primary Examiner* — Edward Raymond
(74) *Attorney, Agent, or Firm* — Staas & Halsey LLP

(57) ABSTRACT

An NOx sensor diagnosis apparatus, which diagnoses an NOx sensor provided in an exhaust pipe to detect a concentration of NOx in exhaust gas, includes a calculation value operating unit to acquire a calculation value of the concentration of NOx in the exhaust gas based on an actuation state of an engine, an error determining unit to determine that the sensor is erroneous when a difference between the calculation value and the detection value of the concentration of NOx detected by the sensor is larger than a determination threshold value, and a determination threshold value setting unit to set the determination threshold value based on a temperature of water for cooling the engine, an atmospheric pressure, and an outdoor temperature.

4 Claims, 2 Drawing Sheets

(51) Int. Cl.
  *F01N 3/20* (2006.01)
  *F02D 41/14* (2006.01)

(52) U.S. Cl.
  CPC ........ *F01N 2610/02* (2013.01); *F01N 2900/14* (2013.01); *F02D 41/146* (2013.01); *F02D 2041/228* (2013.01); *F02D 2200/021* (2013.01); *F02D 2200/0414* (2013.01); *F02D 2200/703* (2013.01); *Y02T 10/24* (2013.01); *Y02T 10/40* (2013.01)

(56) References Cited

U.S. PATENT DOCUMENTS

| | | | |
|---|---|---|---|
| 2009/0199541 A1* | 8/2009 | Walz et al. | 60/276 |
| 2010/0095933 A1 | 4/2010 | Moriya et al. | |
| 2011/0023459 A1* | 2/2011 | Nieuwstadt et al. | 60/285 |
| 2013/0031892 A1* | 2/2013 | Nagaoka et al. | 60/274 |
| 2014/0301925 A1* | 10/2014 | Korpics et al. | 423/212 |

FOREIGN PATENT DOCUMENTS

| | | |
|---|---|---|
| JP | 2008-215213 | 9/2008 |
| JP | 2009-128237 | 6/2009 |

OTHER PUBLICATIONS

Patent Abstracts of Japan, Publication No. 2000-303826, Published Oct. 31, 2000.
Patent Abstracts of Japan, Publication No. 2002-106327, Published Apr. 10, 2002.
Patent Abstracts of Japan, Publication No. 2008-215213, Published Sep. 18, 2008.
Patent Abstracts of Japan, Publication No. 2009-128237, Published Jun. 11, 2009.
International Search Report of PCT/JP2011/061224 mailed Jun. 14, 2011.

* cited by examiner

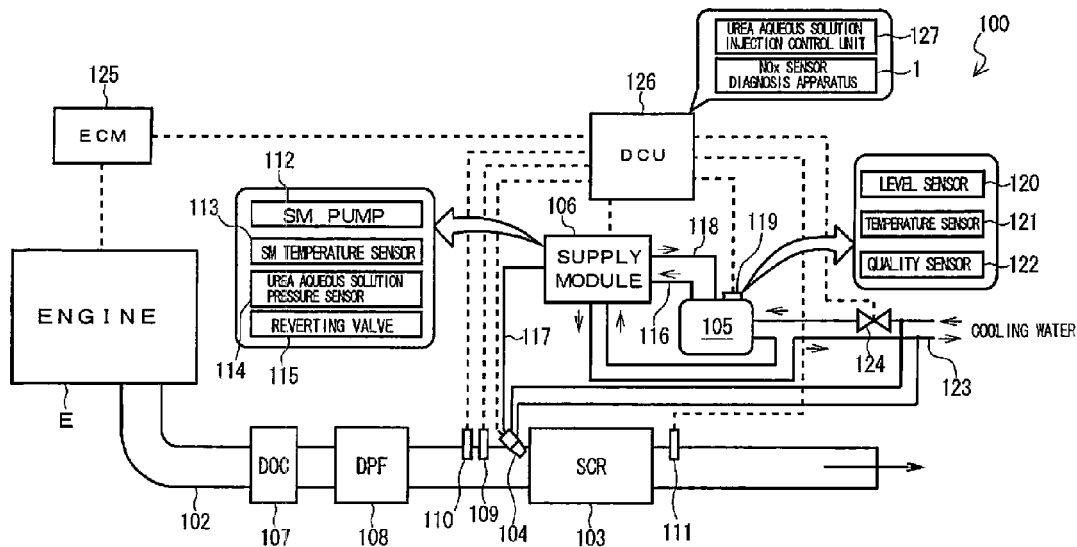
F I G. 1
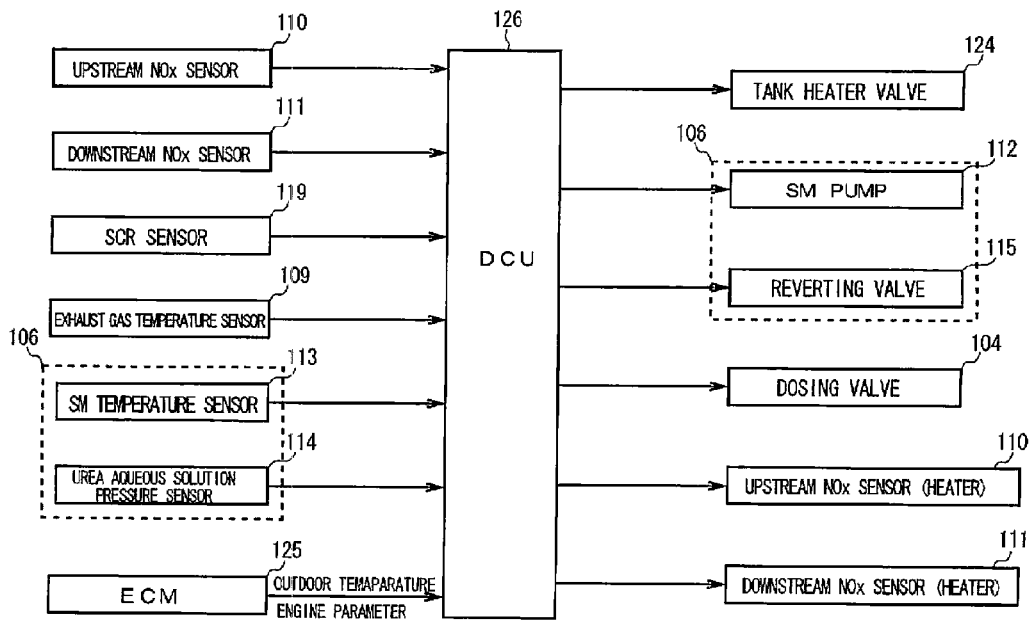
F I G. 2

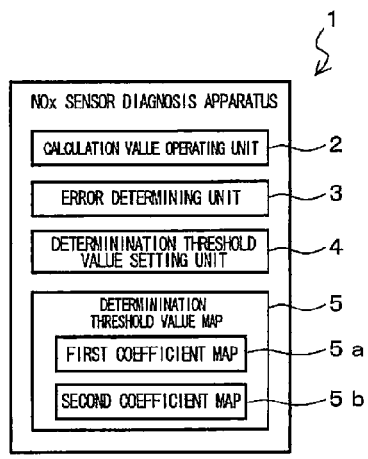
F I G. 3
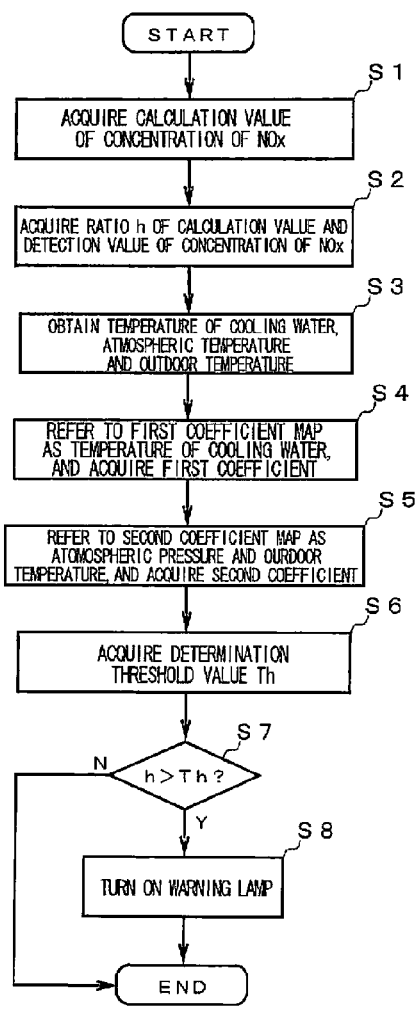
F I G. 4

NOX SENSOR DIAGNOSIS APPARATUS AND SELECTIVE CATALYTIC REDUCTION SYSTEM

CROSS-REFERENCE TO RELATED APPLICATIONS

This application claims the foreign priority benefit of Japanese Application No. 2010-113751 filed May 17, 2010, the contents of which are incorporated herein by reference, which serves as priority for PCT Application No. JP2011/061224 filed May 16, 2011.

TECHNICAL FIELD

The present invention relates to a NOx sensor diagnosis apparatus that diagnoses the appropriateness of a NOx sensor, and an SCR system.

BACKGROUND ART

As an exhaust gas purification system for purifying NOx in exhaust gas of a diesel engine, an SCR system using a selective catalytic reduction apparatus (hereinafter, referred to as an SCR apparatus) has been developed.

The SCR system supplies the urea aqueous solution upstream of the exhaust gas of the SCR apparatus, generates ammonia by heat of the exhaust gas, and reduces and purifies NOx on an SCR catalyst by the ammonia (see, for example, Patent Document 1).

In the SCR system, injection of the urea aqueous solution is controlled according to the concentration of NOx in the exhaust gas. A NOx sensor is provided on an exhaust pipe for the above control.

When a detection value of the NOx sensor is not appropriate, the injection of the urea aqueous solution cannot be appropriately controlled, and thus the SCR system includes a NOx sensor diagnosis apparatus that diagnoses the appropriateness of the NOx sensor.

The NOx sensor diagnosis apparatus in the related art is configured to diagnose that the NOx sensor is erroneous when a difference between a calculation value of the concentration of NOx determined according to an actuation state of an engine and the detection value of the concentration of NOx detected by the NOx sensor is larger than a predetermined threshold value (see, for example, Patent Document 2).

PRIOR ART DOCUMENTS

Patent Documents

Patent Document 1: Japanese Patent Application Publication No. 2000-303826
Patent Document 2: Japanese Patent Application Publication No. 2009-128237

DISCLOSURE OF THE INVENTION

Problems to be Solved by the Invention

However, in the NOx sensor diagnosis apparatus in the related art, the calculation value of the concentration of NOx is determined by only the actuation state of the engine and no environmental condition is considered.

For example, in the NOx sensor diagnosis apparatus in the related art, when the actuation state of the engine is uniform even under a specific environment such as an upland region or a cold region, the calculation value becomes basically the substantially same calculation value of the concentration of NOx. Contrary to this, a detection value of the concentration of NOx actually measured by the NOx sensor significantly varies because an EGR (exhaust gas recirculation) amount decreases, and the like under the specific environment. As a result, the difference between the calculation value and the detection value of the concentration of NOx is increased and it may be misjudged that the NOx sensor is erroneous even though the NOx sensor is not erroneous.

Further, in the NOx sensor diagnosis apparatus in the related art, the calculation value of the concentration of NOx is acquired by using different models in a state in which EGR is cut and a state in which the EGR is not cut, and since the calculation value of the concentration of NOx cannot be made to follow the variation in EGR amount, and particularly, a difference between the calculation value and the detection value of the concentration of NOx is unavoidably increased in a region where the EGR amount is decreased.

Accordingly, an object of the present invention is to solve the problems and to provide a NOx sensor diagnosis apparatus capable of diagnosing the appropriateness of a NOx sensor by considering environmental conditions and preventing misdiagnosis, and an SCR system.

Means for Solving the Problems

To achieve the object of the present invention, there is provided a NOx sensor diagnosis apparatus that diagnoses a NOx sensor provided in an exhaust pipe of an engine and configured to detect the concentration of NOx in exhaust gas. The apparatus includes: a calculation value operating unit configured to acquire the calculation value of the concentration of NOx in the exhaust gas based on the actuation state of the engine; an error determining unit configured to determine that the NOx sensor is erroneous when a difference between the calculation value of the concentration of NOx acquired by the calculation value operating unit and the detection value of the concentration of NOx detected by the NOx sensor is larger than a determination threshold value; and a determination threshold value setting unit configured to set the determination threshold value based on the temperature of the cooling water for cooling the engine, an atmospheric pressure, and an outdoor temperature.

The NOx sensor diagnosis apparatus may further include a determination threshold value map referred to as the temperature of the cooling water, the atmospheric pressure, and the outdoor temperature, and the determination threshold value setting unit may set the determination threshold value by referring to the map.

Further, according to the present invention, there is provided an SCR system including: a selective catalytic reduction apparatus provided in an exhaust pipe of an engine; a dosing valve configured to inject a urea aqueous solution upstream of the selective catalytic reduction apparatus; a NOx sensor provided upstream of the selective catalytic reduction apparatus; and a urea aqueous solution injection control unit configured to control an injection amount of the urea aqueous solution in accordance with a detection value of the concentration of NOx detected by the NOx sensor, and the system includes the NOx sensor diagnosis apparatus according to claim 1 or 2.

Effects of the Invention

According to the present invention, it is possible to provide a NOx sensor diagnosis apparatus capable of diagnosing the appropriateness of a NOx sensor by considering environmental conditions and preventing misdiagnosis, and an SCR system.

BRIEF DESCRIPTION OF THE DRAWINGS

FIG. 1 is a schematic configuration diagram of an SCR system with a NOx sensor diagnosis apparatus according to an embodiment of the present invention.

FIG. 2 is an input/output configuration diagram of a DCU in the SCR system of FIG. 1.

FIG. 3 is a configuration diagram of the NOx sensor diagnosis apparatus in the present invention.

FIG. 4 is a flowchart illustrating a control flow of the NOx sensor diagnosis apparatus of FIG. 3.

BEST MODES FOR CARRYING OUT THE INVENTION

Hereinafter, a preferred embodiment of the present invention will be described with reference to the accompanying drawings.

First, an SCR system mounted on a vehicle will be described.

As illustrated in FIG. 1, an SCR system 100 primarily includes an SCR apparatus 103 provided in an exhaust pipe 102 of an engine E, a dosing valve (a urea aqueous solution injecting device, a dosing module) 104 configured to inject the urea aqueous solution upstream of the SCR apparatus 103 (upstream of exhaust gas), a urea aqueous solution tank 105 configured to retain the urea aqueous solution, a supply module 106 configured to supply the urea aqueous solution retained in the urea aqueous solution tank 105 to the dosing valve 104, and a DCU (dosing control unit) 126 configured to control the dosing valve 104 or the supply module 106.

In the exhaust pipe 102 of the engine E, a DOC (diesel oxidation catalyst) 107, a DPF (diesel particulate filter) 108, and the SCR apparatus 103 are sequentially arranged from upstream to downstream of the exhaust gas. The DOC 107 oxidizes NO in the exhaust gas exhausted from the engine E to form $NO_2$ and is used to improve denitration efficiency in the SCR apparatus 103 by controlling a ratio of NO and $NO_2$ in the exhaust gas. Further, the DPF 108 is used to collect PM (particulate matter) in the exhaust gas.

The dosing valve 104 is provided in the exhaust pipe 102 upstream of the SCR apparatus 103. The dosing valve 104 has a structure in which an injection hole is provided in a cylinder filled with high-pressure urea aqueous solutions and a valve body clogging the injection hole is attached to a plunger, and is configured to inject the urea aqueous solution by making the valve body be spaced apart from the injection hole by raising the plunger through electrical conduction to a coil. When the electrical conduction to the coil stops, the plunger is dropped by internal elastic force, and as a result, the valve body clogs the injection hole, thereby stopping the injection of the urea aqueous solution.

An exhaust temperature sensor 109 configured to measure the temperature of the exhaust gas at an inlet of the SCR apparatus 103 (the temperature of an inlet of the SCR) is provided in the exhaust pipe 102 upstream of the dosing valve 104. Further, an upstream NOx sensor 110 configured to detect a NOx concentration upstream of the SCR apparatus 103 is provided upstream of the SCR apparatus 103 (herein, upstream of the exhaust temperature sensor 109), and a downstream NOx sensor 111 configured to detect the NOx concentration downstream of the SCR apparatus 103 is provided downstream of the SCR apparatus 103.

The supply module 106 includes an SM pump 112 configured to pump the urea aqueous solution, an SM temperature sensor 113 configured to measure the temperature of the supply module 106 (the temperature of the urea aqueous solution that flows in the supply module 106), a urea aqueous solution pressure sensor 114 configured to measure the pressure of the urea aqueous solution in the supply module 106 (the pressure at a discharge side of the SM pump 112), and a reverting valve 115 configured to switch supplying the urea aqueous solution from the urea aqueous solution tank 105 to the dosing valve 104 or reverting the urea aqueous solution in the dosing valve 104 to the urea aqueous solution tank 105 by switching a path of the urea aqueous solution. Herein, when the reverting valve 15 is in an on state, the urea aqueous solution from the urea aqueous solution tank 105 is configured to be supplied to the dosing valve 104 and when the reverting valve 115 is in an off state, the urea aqueous solution in the dosing valve 104 is configured to be reverted to the urea aqueous solution tank 105.

When the reverting valve 115 is switched to supply the urea aqueous solution to the dosing valve 104, the supply module 106 is configured to feed the urea aqueous solution in the urea aqueous solution tank 105 and suction the fed urea aqueous solution through a solution sending line 116, in the SM pump 112, supply the suctioned urea aqueous solution to the dosing valve 104 through a pumping line 117, and revert remaining urea aqueous solution to the urea aqueous solution tank 105 through a recovery line 118.

An SCR sensor 119 is provided in the urea aqueous solution tank 105. The SCR sensor 119 includes a level sensor 120 configured to measure the height (level) of the solution level of the urea aqueous solution in the urea aqueous solution tank 105, a temperature sensor 121 configured to measure the temperature of the urea aqueous solution in the urea aqueous solution tank 105, and a quality sensor 122 configured to measure the quality of the urea aqueous solution in the urea aqueous solution tank 105. The quality sensor 122 detects the concentration of the urea aqueous solution or whether a heterogeneous mixture is mixed in the urea aqueous solution, from, for example, a propagation velocity of ultrasonic waves or electrical conductivity, and detects the quality of the urea aqueous solution in the urea aqueous solution tank 105.

A cooling line 123 configured to circulate cooling water for cooling the engine E is connected to the urea aqueous solution tank 105 and the supply module 106. The cooling line 123 passes through the urea aqueous solution tank 105 to exchange heat between the cooling water that flows in the cooling line 123 and the urea aqueous solution in the urea aqueous solution tank 105. Similarly, the cooling line 123 passes through the supply module 106 to exchange heat between the cooling water that flows in the cooling line 123 and the urea aqueous solution in the supply module 106.

A tank heater valve (coolant valve) 124 configured to switch the supply of the cooling water to the urea aqueous solution tank 105 and the supply module 106 is provided in the cooling line 123. Further, the cooling line 123 is connected to even the dosing valve 104, but the cooling water is configured to be supplied to the dosing valve 104 regardless of opening/closing of the tank heater valve 124. Although not illustrated due to simplification of the drawing in FIG. 1, the cooling line 123 is installed along the solution sending line 116, the pumping line 117, and the recovery line 118 through which the urea aqueous solution passes.

FIG. 2 illustrates an input/output configuration diagram of the DCU 126.

As illustrated in FIG. 2, input signal lines from the upstream NOx sensor 110, the downstream NOx sensor 111, the SCR sensor 119 (the level sensor 120, the temperature sensor 121, and the quality sensor 122), the exhaust temperature sensor 109, the SM temperature sensor 113 and the urea aqueous solution pressure sensor 114 of the supply module 106, and an ECM (engine control module) 125 configured to control the engine E are connected to the DCU 126. Signals of an outdoor temperature and engine parameters (engine rpm, and the like) are input from the ECM 125.

Output signal lines to the tank heater valve 124, the SM pump 112 and the reverting valve 115 of the supply module 106, the dosing valve 104, a heater of the upstream NOx sensor 110, and a heater of the downstream NOx sensor 111 are connected to the DCU 126. An input/output of signals between the DCU 126 and each member may be an input/output through individual signal lines or an input/output through a CAN (controller area network).

A urea aqueous solution injection control unit 127 configured to control an injection amount of the urea aqueous solution according to the detection value of the concentration of NOx detected by the upstream NOx sensor 110 is mounted on the DCU 126. The urea aqueous solution injection control unit 127 is configured to determine the amount of urea aqueous solution injected from the dosing valve 104 based on the estimated amount of NOx in the exhaust gas as well as estimating the amount of NOx in the exhaust gas based on signals of the engine parameters from the ECM 125 and the temperature of the exhaust gas from the exhaust temperature sensor 109, and further, control the dosing valve 104 based on a detection value of the upstream NOx sensor 110 and adjust the amount of the urea aqueous solution injected from the dosing valve 104 when the urea aqueous solution is injected at the amount of the urea aqueous solution determined in the dosing valve 104.

However, the SCR system 100 according to the embodiment includes a NOx sensor diagnosis apparatus 1 configured to diagnose the appropriateness of the upstream NOx sensor 110. The SCR system 100 includes the two NOx sensors 110 and 111, but the NOx sensor diagnosis apparatus 1 diagnoses the appropriateness of the upstream NOx sensor 110 provided upstream of the SCR apparatus 103.

As illustrated in FIG. 3, the NOx sensor diagnosis apparatus 1 includes a calculation value operating unit 2 configured to acquire the calculation value of the concentration of NOx in the exhaust gas based on the actuation state of the engine E (based on the engine parameters from the ECM 125), an error determining unit 3 configured to determine that the upstream NOx sensor 110 is erroneous when a difference between the calculation value of the concentration of NOx acquired by the calculation value operating unit 2 and the detection value of the concentration of NOx detected by the upstream NOx sensor 110 is larger than a determination threshold value, and a determination threshold value setting unit 4 configured to set the determination threshold value based on the temperature of the cooling water for cooling the engine E, an atmospheric pressure, and an outdoor temperature.

The calculation value operating unit 2, the error determining unit 3, and the determination threshold value setting unit 4 are mounted on the DCU 126. Signals of the temperature of the cooling water, the atmospheric pressure, and the outdoor temperature are input from the ECM 125 to the DCU 126 through the CAN. As the signal of the outdoor temperature, a signal of the temperature (intake temperature) of an intake manifold may be used.

In the embodiment, the error determining unit 3 is configured to determine that the upstream NOx sensor 110 is erroneous when a ratio of the calculation value of the concentration of NOx and the detection value of the concentration of NOx (the detection value of the concentration of NOx/the calculation value of the concentration of NOx) is larger than the determination threshold value. The error determining unit 3 may warn a driver by turning on a warning lamp (CEL (check engine lamp)) (not illustrated) or a MIL (multifunction indicator lamp) when it is determined that the upstream NOx sensor 110 is erroneous.

Further, the NOx sensor diagnosis apparatus 1 further includes a determination threshold value map 5 referred to as the temperature of the cooling water, the atmospheric pressure, and the outdoor temperature. The determination threshold value map 5 is a map in which the determination threshold value is set for each of the temperature of the cooling water, the atmospheric pressure, and the outdoor temperature. The determination threshold value setting unit 4 is configured to set the determination threshold value by referring to the determination threshold value map 5. The determination threshold value map 5 is mounted on the DCU 126.

In the embodiment, as the determination threshold value map 5, a first coefficient map 5a referred to as the temperature of the cooling water and a second coefficient map 5b referred to as the atmospheric pressure and the outdoor temperature are used, and the determination threshold value is configured to be acquired by multiplying a first coefficient acquired by the first coefficient map 5a and a second coefficient acquired by the second coefficient map 5b by each other. Further, the determination threshold value map 5 is not limited thereto and as the determination threshold value map 5, a 3D map referred to as the temperature of the cooling water, the atmospheric pressure, and the outdoor temperature may be used.

The first coefficient and the second coefficient are set by acquiring the ratio of the calculation value of the concentration of NOx and the detection value of the concentration of NOx as well as detecting the actual concentration of NOx in the exhaust gas by differentiating environmental conditions such as the temperature of the cooling water, the atmospheric pressure, and the outdoor temperature, and adding a variation permission value considering variation in the sensor to the acquired ratio as a margin, by performing a test in advance.

Subsequently, a control flow of the NOx sensor diagnosis apparatus 1 will be described with reference to FIG. 4.

As illustrated in FIG. 4, first, the calculation value operating unit 2 acquires the calculation value of the concentration of NOx based on the signals of the engine parameters from the ECM 125, in step S1.

After the calculation value of the concentration of NOx is acquired, the error determining unit 3 reads the detection value of the concentration of NOx from the upstream NOx sensor 110 and acquires a ratio h of the calculation value and the detection value of the concentration of NOx from the read detection value of the concentration of NOx and the calculation value of the concentration of NOx acquired in step S1, in step S2.

In step S3, the determination threshold value setting unit 4 acquires data of the temperature of the cooling water, the atmospheric pressure, and the outdoor temperature, from the ECM 125.

In step S4, the determination threshold value setting unit 4 refers to the first coefficient map 5a as the temperature of the cooling water acquired from the ECM 125, and acquires the first coefficient.

In step S5, the determination threshold value setting unit 4 refers to the second coefficient map 5b as the atmospheric pressure and the outdoor temperature acquired from the ECM 125, and acquires the second coefficient.

In step S6, the determination threshold value setting unit 4 multiplies the first coefficient acquired in step S4 by the second coefficient acquired in step S5 to acquire the determination threshold value Th.

In step S7, the error determining unit 3 determines whether the ratio h of the calculation value and the detection value of the concentration of NOx acquired in step S2 is larger than the determination threshold value Th acquired in step S6. When NO is determined in step S7, since it is thought that the upstream NOx sensor 110 is normal, the control just ends.

When YES is determined in step S7, since it is thought that the upstream NOx sensor 110 is erroneous, the error determining unit 3 turns on a warning lamp such as a CEL or an MIL (step S8) and the control ends.

As described above, the NOx sensor diagnosis apparatus 1 according to the embodiment includes the determination threshold value setting unit 4 that sets the determination threshold value used by the error determining unit 3 based on the temperature of the cooling water, the atmospheric pressure, and the outdoor temperature.

That is, the NOx sensor diagnosis apparatus 1 does not correct the calculation value of the concentration of NOx acquired by the calculation value operating unit 2 but sets the determination threshold value when the error is determined according to the environmental conditions to prevent the upstream NOx sensor 110 from being determined as being erroneous even though the upstream NOx sensor 110 is normal.

As a result, by a simple configuration of adding the determination threshold value setting unit 4 to the system in the related art, the appropriateness of the upstream NOx sensor 110 may be diagnosed by considering the environmental conditions and misdiagnosis may be prevented even in the case where an EGR amount decreases under a specific environment such as an upland region or a cold region.

The present invention is not limited to the embodiments but various changes can be made without departing from the spirit of the present invention.

For example, in the embodiment, as a value representing the difference between the calculation value and the detection value of the concentration of NOx, the ratio of the calculation value and the detection value of the concentration of NOx (the detection value of the concentration of NOx/the calculation value of the concentration of NOx) is used, but the present invention is not limited thereto and a difference (absolute value) between the calculation value and the detection value of the concentration of NOx may be used.

EXPLANATION OF REFERENCE NUMERALS

1 NOx sensor diagnosis apparatus
2 Calculation value operating unit
3 Error determining unit
4 Determination threshold value setting unit
5 Determination threshold value map
100 SCR system
102 Exhaust pipe
103 SCR apparatus (selective catalytic reduction apparatus)
104 Dosing valve
105 Urea aqueous solution tank
106 Supply module
110 Upstream NOx sensor (NOx sensor)
111 Downstream NOx sensor
125 ECM
126 DCU
127 Urea aqueous solution injection control unit
E Engine

The invention claimed is:

1. A NOx sensor diagnosis apparatus that diagnoses a NOx sensor provided in an exhaust pipe of an engine and configured to detect the concentration of NOx in exhaust gas, the apparatus comprising:
 a calculation value operating unit configured to acquire the calculation value of the concentration of NOx in the exhaust gas based on the actuation state of the engine;
 an error determining unit configured to determine that the NOx sensor is erroneous when a difference between the calculation value of the concentration of NOx acquired by the calculation value operating unit and the detection value of the concentration of NOx detected by the NOx sensor is larger than a determination threshold value; and
 a determination threshold value setting unit configured to set the determination threshold value based on the temperature of the cooling water for cooling the engine, an atmospheric pressure, and an outdoor temperature.

2. The NOx sensor diagnosis apparatus according to claim 1, further comprising:
 a determination threshold value map referred to as the temperature of the cooling water, the atmospheric pressure, and the outdoor temperature,
 wherein the determination threshold value setting unit is configured to set the determination threshold value by referring to the map.

3. An SCR system including:
 a selective catalytic reduction apparatus provided in an exhaust pipe of an engine;
 a dosing valve configured to inject a urea aqueous solution upstream of the selective catalytic reduction apparatus;
 a NOx sensor provided upstream of the selective catalytic reduction apparatus; and
 a urea aqueous solution injection control unit configured to control an injection amount of the urea aqueous solution in accordance with a detection value of the concentration of NOx detected by the NOx sensor, the system comprising:
 the NOx sensor diagnosis apparatus according to claim 1.

4. An SCR system including:
 a selective catalytic reduction apparatus provided in an exhaust pipe of an engine;
 a dosing valve configured to inject a urea aqueous solution upstream of the selective catalytic reduction apparatus;
 a NOx sensor provided upstream of the selective catalytic reduction apparatus; and
 a urea aqueous solution injection control unit configured to control an injection amount of the urea aqueous solution in accordance with a detection value of the concentration of NOx detected by the NOx sensor, the system comprising:
 the NOx sensor diagnosis apparatus according to claim 2.

* * * * *